Dec. 7, 1937.   B. COHN   2,101,131
METHOD OF MAKING CENTER SPOT CROWNS

Filed Aug. 21, 1936

Bennis Cohn
INVENTOR

BY Frank T. Wentworth
ATTORNEY.

Patented Dec. 7, 1937

2,101,131

UNITED STATES PATENT OFFICE 2,101,131

METHOD OF MAKING CENTER SPOT CROWNS

Benno Cohn, Brooklyn, N. Y., assignor to Ferdinand Gutmann & Co., Brooklyn, N. Y., a corporation of New York Application August 21, 1936, Serial No. 97,094

5 Claims. (Cl. 113—80)

The invention relates to the method of making center spot crowns, and more particularly to a method of securing the center spot disc to the cushion disc of a center spot crown of the type shown in the patent to John Alberti, No. 1,199,026 of September 19, 1916.

The commercial production of center spot crowns of the type above referred to has heretofore been impossible. Albuminous adhesives have low viscosity and no inherent adhesiveness until subjected to a temperature at, or above that at which albumen coagulates.

When it is attempted to apply a disc of center spot material to a surface coated with an albuminous adhesive, the disc has a tendency to side slip, so that it is practically impossible to produce such crowns without having a very high percentage of center spots off center in relation to the cushion disc. Furthermore, a lack of inherent tackiness in an albumen adhesive prevents the center spot from being secured to the cushion disc by means of the adhesive with sufficient tenacity to permit the conveyance of the crown with the center spot upon the cushion disc, to the collecting drum in which heat and pressure are simultaneously applied for the purpose of pressing the center spot firmly against the cushion disc, and holding it under pressure during a time interval sufficient to coagulate the albumen and form a permanent bond.

There is also the difficulty that with light adhesion by means of a low viscosity adhesive, even if the center spot be accurately positioned when first deposited upon the adhesive on the cushion disc, the subsequent application of pressure in the heated zone will cause side slipping of the center spot in the manner above referred to, particularly when the pressure must be developed rapidly and must be continued for a period of approximately eight or nine seconds before the albuminous adhesive is coagulated. During this interval and before its final coagulation, the adhesive first becomes tacky so as to form the bond between the center spot and the cushion disc, which bond is made permanent by the final coagulation of the albumen of the adhesive.

It is essential, in the use of albuminous adhesives that they be in the form of an emulsion, since dry albumen cannot be made tacky or coagulated except in the presence of moisture.

While it has heretofore been proposed to coat the strip of material, from which the center spots are cut, with an albuminous adhesive, this procedure is thoroughly impracticable because the presence of the fluid vehicle will cause the fouling of the dies and also because it is practically impossible to maintain a sufficient volume of the adhesive upon the strip to secure an adequate bonding of the center spot to the cushion disc.

By reason of the above difficulties, it has been impossible to develop a machine which will be effectively used in the production of center spot caps in which the center spot is bonded to the cushion disc by means of an albuminous adhesive.

In center spot crowns, the center spot must be substantially concentric with the cushion disc and must be of a diameter to cause the edge of the center spot disc to lap and engage the neck of a bottle to which the crown is applied. While some tolerance is permissible, if the center spot be off center to any substantial extent, a portion of the edge of the spot will pass out of engagement with the neck of a bottle and form a crevice through which gases, with which the beverage is charged, may readily escape, causing what is known as leakers. Consequently, any method which permits side slipping of any substantial percentage of the center spots during application to the cushion disc, is commercially impracticable.

Center spot crowns at the present time are sold to bottlers at prices ranging from twenty-two to thirty-five cents per gross, this price variance resulting from the materials used in the center spots. Oiled paper, varnished kraft or Express paper, aluminum foil and tin foil are all extensively used, according to the beverage which is to be bottled, the paper spots being used largely with fruit juices, soft drinks and wines, aluminum foil being used in bottling beer and other malt liquors and tin foil being used in the bottling of mineral waters and various chemicals.

The material of the center spot is selected with regard to the action of the contents of a bottle thereupon. In other words, the center spot material must be inert so far as the bottle contents are concerned.

With the above conditions in mind, I have developed a method of producing center spot crowns by means of an albuminous adhesive, the practice of which method avoids any substantial side slipping of the center spot and admits of the rapid production of center spot crowns with a low percentage of spots off center.

In the practice of the method of the invention, I divide the setting of the albuminous adhesive into two stages. In the first stage, a partial coagulation of the albumen, or a partial evaporation of the vehicle is effected, immediately prior to the application of the center spot to the cushion disc so that at the time of such application, the adhesive will be sufficiently tacky to cause a firm adhesion of the center spot material to the cushion disc by a momentary application of pressure. The second stage, which involves a continuing application of heat and pressure to the assembled crown, completes the coagulation of the albumen and gives it a permanent set.

In securing the desired results, time and temperature are important factors, although variable according to the viscosity of the albuminous adhesive.

Machines old and well known for many years in assembling the cushion disc in metal shells by means of an albuminous adhesive may have additional attachments applied thereto to adapt them to the practice of the method of the invention. Such a machine is shown in the patent to Clark, No. 1,134,031.

By means of the method of my invention, it is possible, with one procedure, to bond the cushion disc to the metal shell by means of an albuminous adhesive, and to bond the center spot to the cushion disc, also by means of an albuminous adhesive, with a continuing operation. It is also possible, with another procedure, to practice the method of the invention in connection with preassembled crowns, or crowns in which the cushion disc is already bonded to the metal shell.

The former procedure has the advantage that only one handling of the constituent parts of the crown is necessary, and only a single machine is required in the practice of the method. It has the disadvantage that the time interval required in the collecting drum is determined by the time required to properly condition the albuminous adhesive used in bonding the cushion disc to the metal shell.

The second procedure has the disadvantage that two machines are required in the production of the crowns, but it has the advantage that the time interval required for applying the center spot to the cushion disc is shorter than that required by the first procedure to bond the cushion disc to the metal shell.

The invention consists primarily in a method of making center spot crowns embodying therein the coating of a colloidal solution of albumen upon the exposed face of the cushion disc of a crown, removing a portion of the vehicle of said solution and making it tacky by subjecting it to heat, cutting a center spot disc from an uncoated strip of facing material and forcing it into contact with said coating while it is still tacky, and thereafter subjecting said center spot to a continuing pressure and to heat to bring said coating to a temperature which will coagulate the albumen; and in such other novel steps and practices as are hereinafter set forth and described, and more particularly pointed out in the claims hereto appended.

Referring to the drawing.

Like numerals refer to like parts throughout the several views.

In the accompanying drawing, the several views may indicate a continuing operation in a single machine, as in the first procedure above referred to, or the complete assembly of the cap in two separate machines in accordance with the second procedure above referred to. The only difference in the two procedures, both of which are well known, is that by producing a completed center spot crown in a single continuing operation, a saving of time and labor is effected and likelihood of the mutilation of the decorations upon the metal shell is lessened.

Figure 1:
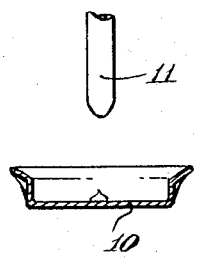
Fig. 1 is a view of a metal shell having deposited therein adhesive for bonding the cushion disc thereto.
Figure 2:
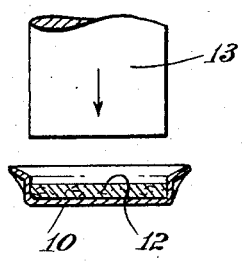
Fig. 2 is a view showing the cushion disc positioned in the shell upon said adhesive.
Figure 5:
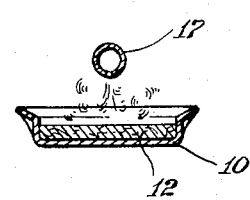
Fig. 5 is a view showing the application of heat to the albuminous coating upon the cushion disc.
Figure 3:
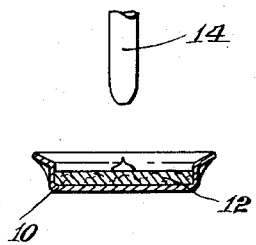
Fig. 3 is a view showing the deposit of an albuminous cement upon the exposed face of the cushion disc.

In the production of center spot crowns, a metal shell 10 has deposited therein a suitable adhesive by any mechanism, such as a dropper 11. A cushion disc 12 is then inserted in the metal shell by a suitable mechanism represented by a plunger 13. These two steps, illustrated in Figs. 1 and 2 of the drawing, are those commonly practiced in the assembly of a crown cap, and when this assembling is completed before the center spot is to be applied thereto, any desired adhesive, such as resin coated paper collets, casein adhesive or an albuminous cement may be used. If a complete center spot crown is to be produced by a continuing operation, an albuminous cement should be used, since the albumen in said cement may be coagulated during the heat and pressure stage of the method of my invention simultaneously with the coagulation of the albumen in the stratum or coating bonding medium between the center spot and the cushion disc.

When applying the center spot disc to the cushion disc, a drop of an albuminous adhesive or cement such as has long been used in securing cushion discs in the metal shell of a crown cap, is delivered substantially centrally of the exposed face of the cushion disc 12 in any desired manner, as by means of a dropper indicated at 14, of a construction which has also long been used in assembling machines in which albumen is used as a bonding medium between the cushion disc and the metal shell.

Figure 4:
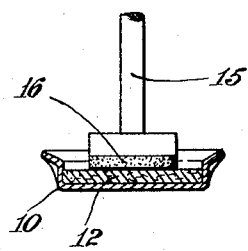
Fig. 4 is a view showing the spreading of the albuminous cement to coat a restricted area of said cushion disc.
Figure 6:
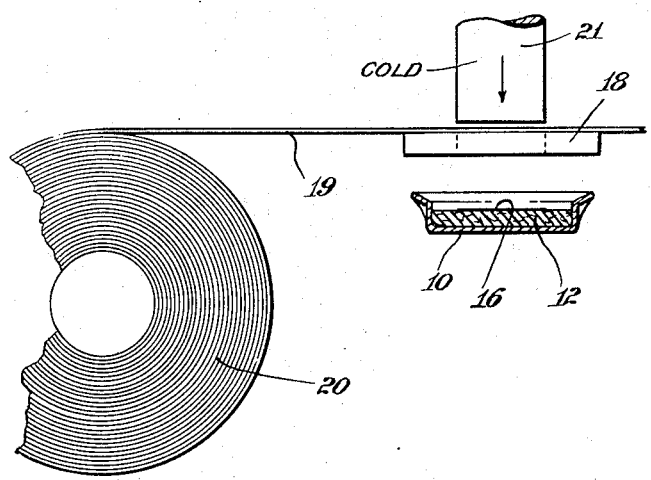
Fig. 6 shows the application of a spot of uncoated material upon the coated surface of the cushion disc.

This albuminous adhesive or cement has low viscosity and possesses no inherent tackiness while in the form in which it is deposited upon the cushion disc. Immediately following the dropping of the adhesive upon the cushion disc, the assembled cap is brought into the operative relation to a rotary spreader shown at 15 in Fig. 4, which serves to spread the albuminous adhesive within a restricted area centrally of the cushion disc forming a thin stratum 16 of the adhesive and limiting this stratum to the central portion of the disc in the manner indicated in Fig. 4.

After leaving the spreader 15, the exposed face of the cushion disc is subjected to the action of heat, as from a burner 17, for a sufficient interval, possibly two or three seconds, to drive off a part of the vehicle of the adhesive or the water in which the albumen is in suspension. This not only increases the viscosity of the adhesive but, apparently by a partial coagulation, makes the thin stratum of adhesive tacky and eliminates all sliminess in the adhesive. This may be termed a partial drying out or partial coagulation of the adhesive. The effect of the heat is to so condition the adhesive that when a disc of the facing material is pressed upon the coated portion 16 of the cushion disc, it will adhere thereto with sufficient tenacity to avoid possible escape or shifting of the center spot disc during the remaining steps in the final completion of the crown.

The condition of the adhesive after it has passed through the heat zone corresponds with one stage leading to coagulation of an albuminous adhesive when following the old procedure of bonding the cushion disc to the metal shell by means of an albuminous cement. In this old method, the assembled caps were delivered cold to a collecting drum having presser plungers, and were subjected to a continuing pressure for between eight and nine seconds and to a temperature at, or in excess of that at which albumen coagulates, between 140° and 160° F. Between the initial application of heat and the attainment of the coagulating temperature of the albumen, a stage was reached below this coagulating temperature in which moisture was driven from the adhesive, causing it to become tacky and form a bond between the lacquer upon the inside of the metal shell and the cork of the cushion disc, this stage being followed by the complete coagulation of the albumen forming a permanent bond by means of an insoluble residue.

By subjecting the coating to an elevated temperature and for a time interval sufficient to evaporate a part of the liquid vehicle, and without bringing the temperature of the adhesive to a point which will coagulate the albumen, it is possible to develop and hold tackiness in the adhesive which will prevent its spreading when the center spot is pressed into contact therewith. Thus a light bond between the center spot and the cushion disc is not only formed, but side slipping of the center spot is avoided. This latter will not occur when the adhesive is tacky and when its viscosity is increased by elimination of a part of the vehicle.

In view of the foregoing, it is obvious that the temperature to which the coating of albuminous adhesive is subjected, prior to the depositing of the center spot thereon and the time interval to which it is so subjected, must be such as to avoid bringing the albumen to the coagulation temperature. The temperature and the time interval, however, must be sufficiently great to drive off sufficient volume of the vehicle to make the adhesive tacky.

When referring to the temperature to which the albuminous adhesive is subjected, I mean that this temperature and the time interval must be such, irrespective of the temperature at the source of heat, to avoid bringing the adhesive itself to or above the coagulation temperature of the albumen.

After the crown leaves the heated zone, it is brought, while the adhesive is still tacky, below a cutting die 18 over which is fed a strip 19 of facing material drawn from a roll 20.

The method of my present invention is particularly adapted for applying metal foil spots to cushion discs, and the strip 19 consists of a strip of such metal not coated with adhesive upon either face thereof. When each crown is accurately positioned below the die 18, the cutting plunger 21, which is cold, descends, cutting a disc from the strip 19 and forcing it downwardly and pressing it against the stratum 16 of the tacky albuminous adhesive. A heavy pressure is not required in applying the center spot to the adhesive stratum, merely enough pressure being required to cause the center spot to be adhered to the cushion disc sufficiently firmly to avoid possible displacement in the travel of the crown from the die 18 to the collecting drum where it is subjected to continuing pressure and heat at a temperature which will bring the albuminous adhesive to or above the coagulation temperature of the albumen therein.

Figure 7:
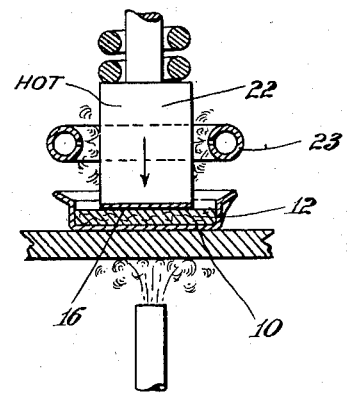
Fig. 7 shows the heat and pressure stage for causing coagulation of the albuminous cement.

This stage of the method is shown in Fig. 7 of the drawing, in which 22 indicates a spring pressed plunger which is maintained at the desired elevated temperature in any desired manner, shown conventionally as a gas burner 23.

The amount of pressure required, while subject to wide variation, need not be in excess of from fourteen to sixteen pounds, or merely sufficient to ensure the desired intimate contact between the entire area of the center spot and the entire area of the stratum 16.

The completely assembled crown is subjected to a continuing pressure from the plunger 22 and to the heat of this plunger for a time interval sufficient to raise the temperature of the adhesive in the stratum 16 to the coagulation temperature of albumen, about 140° F. When the albumen is coagulated, a permanent bond is effected, since albuminous adhesives set at the coagulation temperature of the albumen and not as a result of a subsequent cooling action or a subsequent evaporation of the vehicle, as with heat fusible casein or water soluble adhesives.

By reason of the tackiness of the adhesive when the center spot is deposited thereon, there is little or no tendency toward a side slipping of the center spot when pressure is applied thereto by the male die 21 or by the presser plunger 22.

When the procedure followed involves the bonding of the cushion disc to the metal shell and the bonding of the center spot to the cushion disc by a continuing operation, the time interval during which the crown is subjected to heat and pressure, as illustrated in Fig. 7, will be co-extensive with the time interval required to coagulate the adhesive used for bonding the cushion disc in the metal shell. When, however, the center spot is applied to a previously assembled crown in which the cushion disc is already bonded to the metal shell, the evaporation of a part of the vehicle of the adhesive prior to the depositing of the center spot thereon, reduces the time interval required in bringing the albuminous adhesive to the coagulating temperature, since the first stages normally present in the use of the albuminous adhesive in bringing it to a state of tackiness, have occurred prior to the delivery of the crown to the heat and pressure mechanism.

The method of the invention may be carried on in a wide variety of different machines, the particular mechanisms employed being non-essential to the practice of the method of the invention.

The essential steps of the method are the application of a thin stratum of an albuminous adhesive to the central portion of the cushion disc in a metal shell, the subjecting of the stratum of adhesive to a temperature and for a time interval which will drive off a part of the vehicle without fully coagulating the albumen so as to make the adhesive tacky and increase its viscosity to an extent to eliminate any tendency toward slipperiness, the deposit upon the tacky stratum of a facing disc of uncoated material, and finally, subjecting the assembly to a continuing pressure and a temperature which will bring the stratum of albuminous adhesive to a temperature which will result in the coagulation of the albumen.

As in the production of all center spot crowns, the entire area of the center spot should be subjected to pressure to ensure a firm bonding of the edge of the spot to the cushion disc.

With the procedure above described, there is no tendency toward the extrusion of the adhesive from between the center spot and the cushion disc to an extent to permit the escape or separation of small granules of the adhesive while the crowns are being tumbled in a filling machine, and the ultimate escape of these small particles into the bottles being filled.

The adhesive is spread in a thin stratum about the center of the cushion disc, and the driving off of a part of the vehicle to make the adhesive tacky further reduces the thickness of the stratum as it reaches a tacky condition. In fact, when the adhesive is tacky, it becomes plastic or semi-plastic, which condition prevents the side slipping of the center spot herein referred to.

Albuminous adhesives have been used for many years, and the formulae of such adhesives vary greatly. They all, however, have in common, the characteristics herein referred to of becoming tacky as the temperature of the adhesive increases, a final permanent set being accomplished when the coagulation temperature of albumen is attained.

It is not my intention to limit the invention of any particular ingredients or proportions of the constituents of the albumen adhesive used, it being obvious that such may be varied without departing from the spirit and scope of the invention.

Having described the invention, what I claim as new and desire to have protected by Letters Patent, is:—

1. A method of making center spot crowns embodying therein the coating of a colloidal solution of albumen upon the exposed face of the cushion disc of a crown, removing a portion of the vehicle of said solution and making it tacky by subjecting it to heat, cutting a center spot disc from an uncoated strip of facing material and forcing it into contact with said coating while it is still tacky, and thereafter subjecting said center spot to a continuing pressure and to heat to bring said coating to a temperature which will coagulate the albumen.

2. A method of making center spot crowns embodying therein the applying of a colloidal solution of albumen to the exposed face of a cushion disc in a metal shell, spreading said solution in a thin coating throughout the central portion of said disc, subjecting said coating to heat for a time interval which will evaporate a portion of the vehicle of said solution and make the coating tacky, cutting from an uncoated strip of facing material a center spot disc of substantially the same area as the portion of said cushion disc coated with said solution, applying said center spot disc with a light pressure to said coating while said solution is still tacky, and thereafter subjecting said center spot to a continuing pressure and to heat to bring said coating to a temperature which will coagulate the albumen.

3. A method of making center spot crowns embodying therein the delivery of a suitable adhesive to the metal shell of a crown, depositing a cushion disc upon said adhesive, applying a coating of a colloidal solution of albumen to the exposed face of said cushion disc, removing a portion of the vehicle of said solution and making it tacky by subjecting it to heat, cutting a center spot disc from an uncoated strip of facing material and forcing it into contact with said coating while it is still tacky, thereafter applying pressure to said center spot disc and therethrough to said cushion disc, and subjecting said center spot disc and said metal shell to heat to bring said coating to a temperature which will coagulate the albumen and simultaneously bond said cushion disc to said metal shell and said center spot to said cushion disc.

4. A method of making center spot crowns embodying therein the delivery of a colloidal solution of albumen to the metal shell of a crown, depositing a cushion disc upon said solution, applying a coating of a colloidal solution of albumen to the exposed face of said cushion disc, removing a portion of the vehicle of said solution and making it tacky by subjecting it to heat, cutting a center spot disc from an uncoated strip of facing material and forcing it into contact with said coating while it is still tacky, thereafter applying pressure to said center spot disc and therethrough to said cushion disc, and subjecting said center spot disc and said metal shell to heat to bring said coating to a temperature which will coagulate the albumen and simultaneously bond said cushion disc to said metal shell and said center spot to said cushion disc.

5. A method of making center spot crowns embodying therein the delivery of a colloidal solution of albumen to the metal shell of a crown, depositing a cushion disc upon said solution, applying a colloidal solution of albumen to the exposed face of said cushion disc, spreading said solution in a thin coating throughout the central portion of said disc, subjecting said coating to heat for a time interval which will evaporate a portion of the vehicle of said solution and make the coating tacky, cutting from an uncoated strip of facing material a center spot disc of substantially the same area as the portion of said cushion disc coated with said solution, applying said center spot disc with a light pressure to said coating while said solution is still tacky, thereafter applying pressure to said center spot disc and therethrough to said cushion disc, and subjecting said center spot disc and said metal shell to heat to simultaneously bring the albuminous solution between said metal shell and said cushion disc, and between said cushion disc and said center spot disc to a temperature which will coagulate the albumen.

BENNO COHN.